(12) United States Patent
Pawar et al.

(10) Patent No.: US 8,383,970 B2
(45) Date of Patent: Feb. 26, 2013

(54) RESTRAINT SYSTEM FOR SWITCHGEAR DRAWOUT BREAKERS

(75) Inventors: Rahul Pawar, Lake Mary, FL (US); Harshavardhan M. Karandikar, Longwood, FL (US); Ronald Holmes, Longwood, FL (US)

(73) Assignee: ABB Technology AG, Zurich (CH)

( * ) Notice: Subject to any disclaimer, the term of this patent is extended or adjusted under 35 U.S.C. 154(b) by 309 days.

(21) Appl. No.: 12/877,451

(22) Filed: Sep. 8, 2010

(65) Prior Publication Data
US 2012/0057276 A1    Mar. 8, 2012

(51) Int. Cl.
*H01H 9/00* (2006.01)
(52) U.S. Cl. .................. 200/50.21; 200/50.24; 361/609
(58) Field of Classification Search ............... 200/50.17, 200/50.21–50.25; 361/601, 605–609, 615, 361/618, 619
See application file for complete search history.

(56) References Cited

U.S. PATENT DOCUMENTS

| | | | |
|---|---|---|---|
| 1,768,535 A | 7/1930 | Ainsworth | |
| 2,273,002 A | 2/1942 | Mahoney | |
| 2,412,931 A | 12/1946 | West | |
| 2,689,293 A | 9/1954 | Claybourn et al. | |
| 2,702,324 A | 2/1955 | Donaldson | |
| 2,711,452 A * | 6/1955 | Spencer et al. ............ | 200/50.23 |
| 2,762,879 A * | 9/1956 | Wills ......................... | 200/50.21 |
| 4,012,610 A * | 3/1977 | Ericson et al. ............. | 200/50.26 |
| 4,176,262 A * | 11/1979 | McMillen et al. .......... | 200/50.23 |
| 4,205,207 A * | 5/1980 | Clausing .................... | 200/50.24 |
| 4,486,814 A * | 12/1984 | Ishikawa et al. ............ | 361/609 |
| 4,489,362 A * | 12/1984 | Castonguay et al. ......... | 361/609 |
| 4,728,757 A | 3/1988 | Buxton et al. | |
| 4,950,854 A | 8/1990 | Green | |
| 5,142,110 A | 8/1992 | Kuehne et al. | |
| 5,459,293 A | 10/1995 | Hodkin et al. | |
| 5,915,985 A * | 6/1999 | Fabian et al. .................. | 439/248 |
| 6,951,990 B1 | 10/2005 | Miller | |
| 2008/0094782 A1 * | 4/2008 | Mason .......................... | 361/609 |

* cited by examiner

*Primary Examiner* — Michael Friedhofer
(74) *Attorney, Agent, or Firm* — Manelli Selter PLLC; Edward J. Stemberger

(57) ABSTRACT

A switchgear system includes rail structure having a base coupled to an interior sidewall of a frame. A first member extends from the base and has an upwardly facing surface. The first member has a second surface extending generally transversely to the upwardly facing surface to oppose a surface of the base. A second member extends from the base and has a downwardly facing surface spaced from the upwardly facing surface so as to define a wheel receiving channel therebetween. A circuit breaker tuck includes wheels on exterior sidewalls. The wheels are received in the wheel receiving channel to be slidable along the upwardly facing surface, with the upwardly and downwardly facing surfaces limiting movement of the circuit breaker truck about the horizontal axis and the surface of the base and the second surface of the first member limiting movement of the circuit breaker truck about the vertical axis.

15 Claims, 2 Drawing Sheets

RESTRAINT SYSTEM FOR SWITCHGEAR DRAWOUT BREAKERS

BACKGROUND OF THE INVENTION

The present invention relates to an electrical switchgear and, more particularly, to a wheel/rail structure of a drawout circuit breaker truck assembly for restraining the circuit breaker truck assembly under fault conditions in a frame of the switchgear.

With reference to FIG. 1, a conventional switchgear, generally indicated at 10, includes a circuit breaker truck assembly, generally indicated at 11. The truck assembly 11 includes a circuit breaker truck 12 that carries racked-in power circuit breaker 13 so that the circuit breaker 13 can be withdrawn from a frame 14 of the switchgear 10 for maintenance. In particular, the frame 14 includes at least one rail 15. Wheels 16 (only one shown in FIG. 1) are mounted to at least one side of the circuit breaker truck 12. The wheels 16 are supported by the rail 15 such that an inside portion of each wheel 16 of the circuit breaker truck 12 slides on the rail 15. Under short circuit conditions, there are moments on the circuit breaker poles that cause the circuit breaker truck assembly 11 to twist about its horizontal and vertical axes. This movement may force the circuit breaker truck assembly 11 to jump off the rails 15 and raises the possibility of an arc initiation if the primary contacts separate from the bushings.

Thus, there is a need to provide an improved rail and breaker wheel arrangement so as to restrain the circuit breaker truck assembly in place under fault conditions.

SUMMARY OF THE INVENTION

An objective of the present invention is to fulfill the need referred to above. In accordance with the principles of the invention, this objective is obtained by providing a switchgear system that includes a frame having interior sidewalls defining an interior space. A rail structure includes a base coupled to at least one of the interior sidewalls. A first member extends from the base into the interior space. The first member has an upwardly facing surface and a second surface extending generally transversely with respect to the upwardly facing surface so as to oppose a surface of the base. A second member extends from the base into the interior space. The second member has a downwardly facing surface spaced from the upwardly facing surface so as to define a wheel receiving channel there-between. A circuit breaker truck includes exterior sidewalls with at least one wheel being mounted to at least one of the exterior sidewalls. The wheel is received in the wheel receiving channel so as to be slidable along the upwardly facing surface, with the upwardly and downwardly facing surfaces limiting movement of the circuit breaker truck about the horizontal axis and the surface of the base and the second surface of the first member limiting movement of the circuit breaker truck about the vertical axis.

In accordance with another aspect of the present invention, a method limits movement of a circuit breaker truck assembly mounted in a frame of a switchgear system. The method provides rail structure having a base coupled to at least one of the interior sidewalls of the frame; a first member extending from the base, the first member having an upwardly facing surface and a second surface extending generally transversely with respect to the upwardly facing surface so as to oppose a surface of the base; and a second member extending from the base into the interior space, the second member having a downwardly facing surface spaced from the upwardly facing surface so as to define a wheel receiving channel three-between. The method provides a circuit breaker truck assembly including a circuit breaker truck and a circuit breaker carried by the truck. The truck includes exterior sidewalls with at least one wheel mounted to at least one of the exterior sidewalls. The wheel is inserted into the wheel receiving channel so as to be slidable along the upwardly facing surface. When a fault condition occurs, the method ensures that the upwardly and downwardly facing surfaces limit movement of the circuit breaker truck assembly about the horizontal axis and ensures that the surface of the base and the second surface of the first member limit movement of the circuit breaker truck assembly about the vertical axis.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXAMPLE EMBODIMENT

Figure 1:
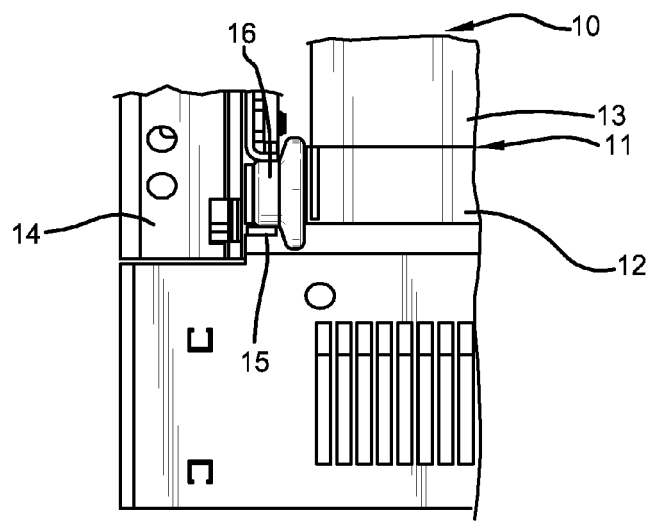
FIG. 1 is a partial front view of a conventional switchgear showing a wheel of a circuit breaker truck assembly mounted on a rail of a frame.
Figure 2:
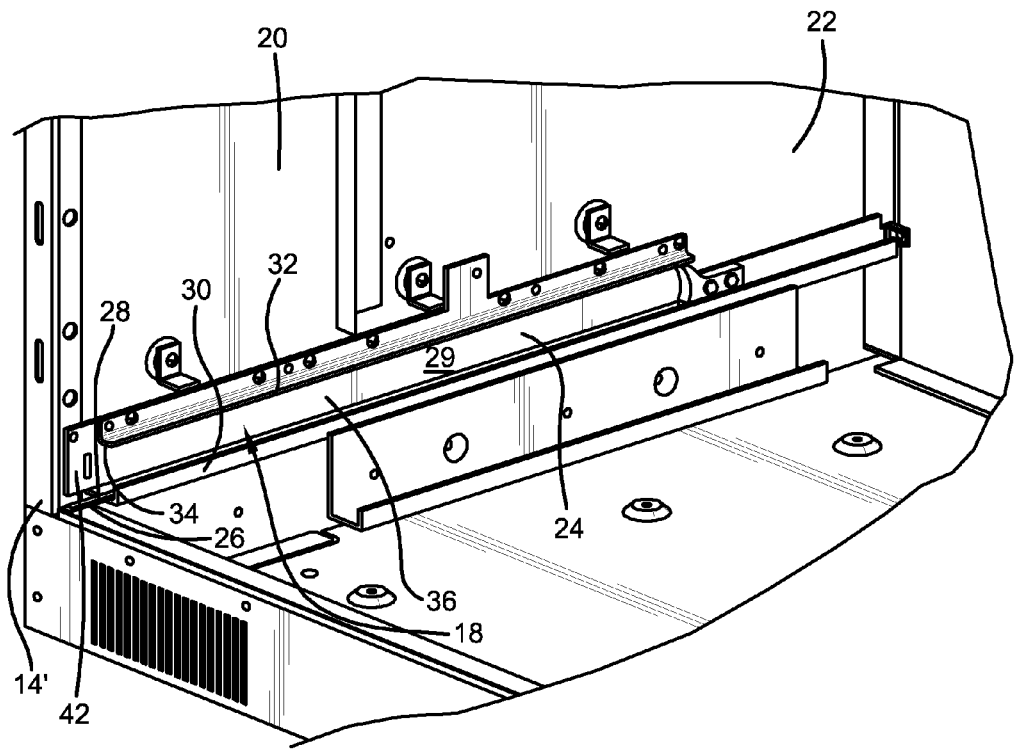
FIG. 2 is side perspective view of rail structure of an embodiment, shown mounted to a frame of a switchgear system.

Referring to FIG. 2, rail structure, generally indicated at 18, is shown mounted to an inner sidewall 20 of a frame 14'. The frame 14' has an opposing inner sidewall (not shown) with the sidewalls defining an interior space 22. The frame 14' is of a switchgear system 10' (FIG. 3) and can be of the type disclosed in U.S. Pat. No. 7,124,488, the content of which is hereby incorporated by reference into this specification.

The rail structure 18 includes a base 24 coupled to at least one of the interior sidewalls 20. A first member 26 is coupled to or integral with the base 24 and extends from the base 24 into the interior space 22. The first member 26 has an upwardly facing surface 28 and has a second surface 30 extends generally transversely with respect to the upwardly facing surface 28 so as to oppose surface 29 of the base 24.

The rail structure 18 also includes a second, generally L-shaped, member 32 coupled to or integral with the base and extending from the base 24 into the interior space 22. The second member 32 has a downwardly facing surface 34 spaced from the upwardly facing surface 28 so as to define a wheel receiving channel 36 there-between.

Figure 3:
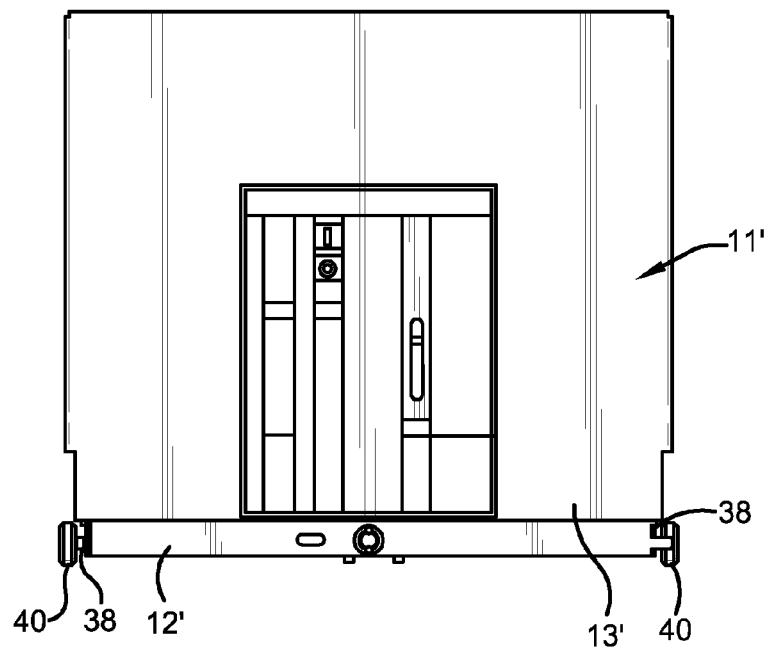
FIG. 3 is a front view of a circuit breaker truck assembly of an embodiment.

As shown in FIGS. 2 and 3, the switchgear system 10' includes circuit breaker truck assembly, generally indicated at 11'. The tuck assembly 11 includes a circuit breaker truck 12' that carries a drawout type circuit breaker 13'. Wheels 40 are mounted to opposing exterior sidewalls 38 of the truck 12'. Preferably, a pair of wheels 40 is mounted on each sidewall 38 of the truck 12'.

Figure 4:
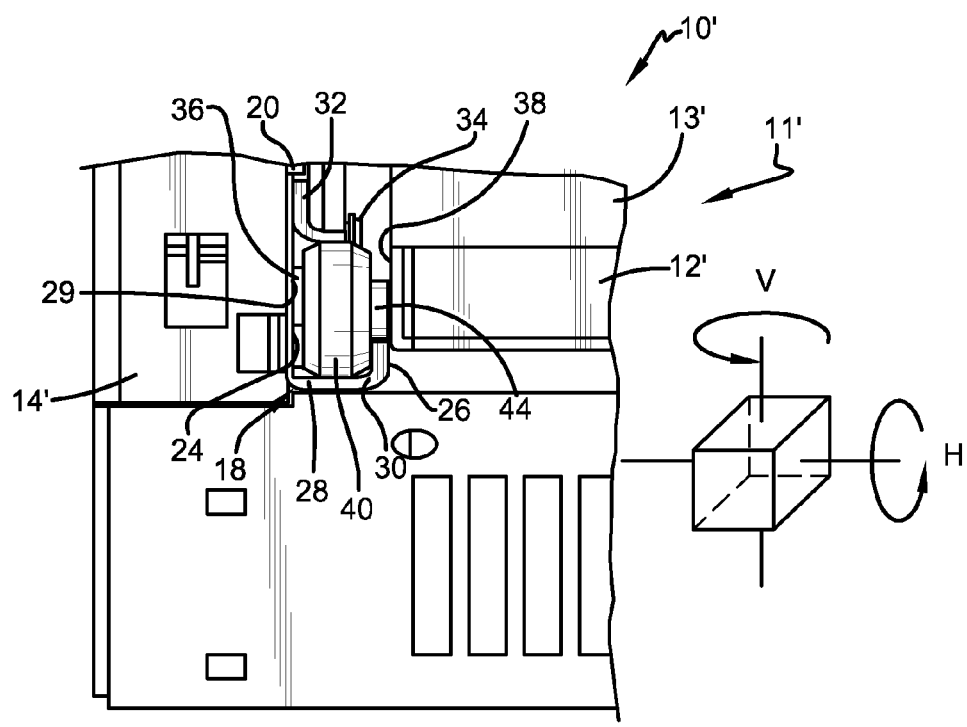
FIG. 4 is a partial front view of a switchgear system of the embodiment, showing a wheel of a circuit breaker truck assembly of FIG. 3 mounted to the rail structure of FIG. 2.

With reference to FIG. 4, the pair of wheels 40 is received in the wheel receiving channel 36 so as to be slidable along the upwardly facing surface 28, with the upwardly and downwardly facing surfaces 28 and 34, respectively, limiting movement of the circuit breaker truck 12' and thus the truck assembly 11' about the horizontal axis H. Surface 29 of the base 24 of the rail structure 18 and the second surface 30 of the first member 36 limit movement of the circuit breaker truck 12' and thus the truck assembly 11' about the vertical axis V. Thus, since the wheels 40 are substantially captured by the rail structure 18, the rail structure 18 holds the circuit breaker truck assembly 11' firmly in place under fault conditions. Thus, twisting of the circuit breaker truck assembly 11' during fault conditions is reduced or eliminated.

As best shown in FIG. 2, the receiving channel 36 has an open end 42 for ease of insertion of the wheels 40 into the channel 36. The rail structure 18 can be of the type that slides outwardly from the frame 14' for further access when inserting the wheels 40 of the circuit breaker truck 12'.

Furthermore, with reference to FIG. 4, to ensure capturing of the wheels 40, the spacing between the upwardly facing surface 28 and the downwardly facing surface 34 of the rail structure 18 is only slightly greater than the diameter of the wheels 40. In addition, the second surface 30 of the first member of the rail structure 18 extends upwardly with respect to the upwardly facing surface 28 so as to be adjacent to an inner portion of the wheel 40 and slightly below the central axle 44 of the wheel 40. Thus, the axles of the wheels 40 are unobstructed by the rail structure 18. The wheels 40 also have some designed "play" along the axis of rotation so that the circuit breaker assembly 11 can slide easily along the structure 18.

Thus, the present invention restrains a circuit breaker during fault conditions. In particular, the rail structure limits any twisting of the circuit breaker truck assembly 11' along both the horizontal and vertical axes by capturing the wheels of the circuit breaker truck 12'. As a result, arc initiation is reduced since the primary contacts of the circuit breaker do not separate from the bushings.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A switchgear system comprising:
   a frame including interior sidewalls defining an interior space,
   a rail structure comprising:
      a base coupled to at least one of the interior sidewalls,
      a first member extending from the base into the interior space, the first member having an upwardly facing surface and a second surface extending generally transversely with respect to the upwardly facing surface so as to oppose a surface of the base, and
      a second member extending from the base into the interior space, the second member having a downwardly facing surface spaced from the upwardly facing surface so as to define a wheel receiving channel there-between, and
   a circuit breaker truck including exterior sidewalls with at least one wheel being mounted to at least one of the exterior sidewalls, the wheel being received in the wheel receiving channel so as to be slidable along the upwardly facing surface, with the upwardly and downwardly facing surfaces being constructed and arranged under certain conditions to directly contact a rolling surface of the at least one wheel, thereby limiting movement of the circuit breaker truck about the horizontal axis thereof and the surface of the base and the second surface of the first member limiting movement of the circuit breaker truck about the vertical axis thereof.

2. The system of claim 1, wherein the wheel receiving channel has at least one open end so that the wheel can be inserted therein.

3. The system of claim 1, wherein the surface of the first member of the rail structure extends with respect to the upwardly facing surface so as to be adjacent to an inner a side portion of the wheel and below a central axle of the wheel.

4. The system of claim 1, wherein the second member is generally L-shaped in section.

5. The system of claim 1, further comprising a circuit breaker carried by the circuit breaker truck.

6. The switchgear system of claim 1, wherein the surface of the base and the second surface of the first member are constructed and arranged under certain conditions to engage opposing side portions of the at least one wheel thereby limiting movement of the circuit breaker truck about the vertical axis.

7. A rail structure for coupling to frame of a switchgear system, the frame including interior sidewalls, the rail structure comprising:
   a base constructed and arranged to be coupled to at least one of the interior sidewalls of the frame,
   a first member extending from the base, the first member having an upwardly facing surface and a second surface extending generally transversely with respect to the upwardly facing surface so as to oppose a surface of the base, and
   a second member extending from the base into the interior space, the second member having a downwardly facing surface spaced from the upwardly facing surface so as to define a wheel receiving channel there-between, under certain conditions the upwardly facing surface and the downwardly facing surface being constructed and arranged to directly contact a rolling surface of a wheel when the wheel is received in the channel.

8. The rail structure of claim 7, wherein the wheel receiving channel has at least one open end so that a wheel can be inserted therein.

9. The rail structure of claim 7, wherein the second member is generally L-shaped in section.

10. The rail structure of claim 7, in combination with the frame and with a circuit breaker truck assembly having a circuit breaker truck carrying a circuit breaker, the circuit breaker truck having exterior sidewalls with at least one wheel being mounted to at least one of the exterior sidewalls, the wheel being received in the wheel receiving channel so as to be slidable along the upwardly facing surface, with the upwardly and downwardly facing surfaces capturing a portion of the wheel to limit movement of the circuit breaker truck assembly about the horizontal axis thereof and the surface of the base and the second surface of the first member capturing another portion of the wheel to limit movement of the circuit breaker truck assembly about the vertical axis thereof.

11. The rail structure of claim 10, wherein the surface of the base and the second surface of the first member are constructed and arranged under certain conditions to engage opposing side portions of the at least one wheel thereby limiting movement of the circuit breaker truck about the vertical axis.

12. The combination of claim 10, wherein the surface of the first member of the rail structure extends with respect to the upwardly facing surface so as to be adjacent to an inner a side portion of the wheel and below a central axle of the wheel.

13. A method of limiting movement of a circuit breaker truck assembly mounted in a frame of a switchgear system, the method comprising the step of:

providing rail structure comprising a base coupled to at least one of the interior sidewalls of the frame; a first member extending from the base, the first member having an upwardly facing surface and a second surface extending generally transversely with respect to the upwardly facing surface so as to oppose a surface of the base; and a second member extending from the base into the interior space, the second member having a downwardly facing surface spaced from the upwardly facing surface so as to define a wheel receiving channel therebetween, providing a circuit breaker truck assembly including a circuit breaker truck and a circuit breaker carried by the circuit breaker truck, the circuit breaker truck including exterior sidewalls with at least one wheel being mounted to at least one of the exterior sidewalls, inserting the at least one wheel in the wheel receiving channel so as to be slidable along the upwardly facing surface, and when a fault condition occurs, ensuring that the upwardly and downwardly facing surfaces can directly engage a rolling surface of the at least one wheel to limit movement of the circuit breaker truck assembly about the horizontal axis thereof and ensuring that the surface of the base and the second surface of the first member limit movement of the circuit breaker truck assembly about the vertical axis thereof.

14. The method of claim 13, wherein the rail structure is provided to ensure that the surface of the first member of the rail structure extends with respect to the upwardly facing surface so as to be adjacent to an inner a side portion of the wheel and below a central axle of the wheel.

15. The method of claim 13, wherein during the ensuring step, the surface of the base and the second surface of the first member are constructed and arranged under certain conditions to engage opposing side portions of the at least one wheel thereby limiting movement of the circuit breaker truck about the vertical axis.

* * * * *